United States Patent
Nonaka et al.

(10) Patent No.: US 9,450,693 B2
(45) Date of Patent: Sep. 20, 2016

(54) TRANSMISSION APPARATUS AND DATA TRANSMISSION METHOD

(75) Inventors: Ayumu Nonaka, Fukuoka (JP); Mamoru Suematsu, Fukuoka (JP)

(73) Assignee: FUJITSU LIMITED, Kawasaki (JP)

( * ) Notice: Subject to any disclaimer, the term of this patent is extended or adjusted under 35 U.S.C. 154(b) by 334 days.

(21) Appl. No.: 13/424,804

(22) Filed: Mar. 20, 2012

(65) Prior Publication Data

US 2012/0300771 A1 Nov. 29, 2012

(30) Foreign Application Priority Data

May 26, 2011 (JP) .................................. 2011-118491

(51) Int. Cl.
*H04J 3/04* (2006.01)
*H04J 3/16* (2006.01)
*H04J 3/06* (2006.01)
*H04L 12/931* (2013.01)

(52) U.S. Cl.
CPC ............ *H04J 3/1652* (2013.01); *H04J 3/0691* (2013.01); *H04L 49/357* (2013.01)

(58) Field of Classification Search
USPC .................. 370/252, 465, 466, 467, 535
See application file for complete search history.

(56) References Cited

U.S. PATENT DOCUMENTS

| | | | | |
|---|---|---|---|---|
| 7,286,487 B2* | 10/2007 | Perkins et al. | ................ | 370/253 |
| 7,782,843 B2* | 8/2010 | Zou et al. | ...................... | 370/360 |
| 7,809,017 B2* | 10/2010 | Harley et al. | ................. | 370/474 |
| 8,274,892 B2* | 9/2012 | Chiang et al. | ................. | 370/235 |
| 8,412,040 B2* | 4/2013 | Valiveti et al. | ................. | 398/52 |
| 8,644,333 B2* | 2/2014 | Wei et al. | ...................... | 370/464 |
| 8,649,400 B2* | 2/2014 | Darr et al. | ..................... | 370/503 |
| 2003/0123493 A1* | 7/2003 | Takahashi | ..................... | 370/539 |
| 2007/0264015 A1* | 11/2007 | Li et al. | ......................... | 398/45 |

FOREIGN PATENT DOCUMENTS

| | | |
|---|---|---|
| JP | 2003-188919 | 7/2003 |
| JP | 2011-223453 | 11/2011 |

OTHER PUBLICATIONS

JPOA—Office Action of Japanese Patent Application No. 2011-118491, mailed on Jan. 6, 2015, with partial English language translation.

* cited by examiner

*Primary Examiner* — Ricky Ngo
*Assistant Examiner* — Christine Ng
(74) *Attorney, Agent, or Firm* — Fujitsu Patent Center

(57) ABSTRACT

A transmission apparatus includes a clock generator that generates a clock. When data is received, the transmission apparatus maps a plurality of pieces of received asynchronous data to a cross connection frame by using the generated clock. The transmission apparatus also cross-connects the mapped cross connection frame by using the generated clock. The transmission apparatus also transmits data of the cross-connected cross connection frame.

5 Claims, 17 Drawing Sheets

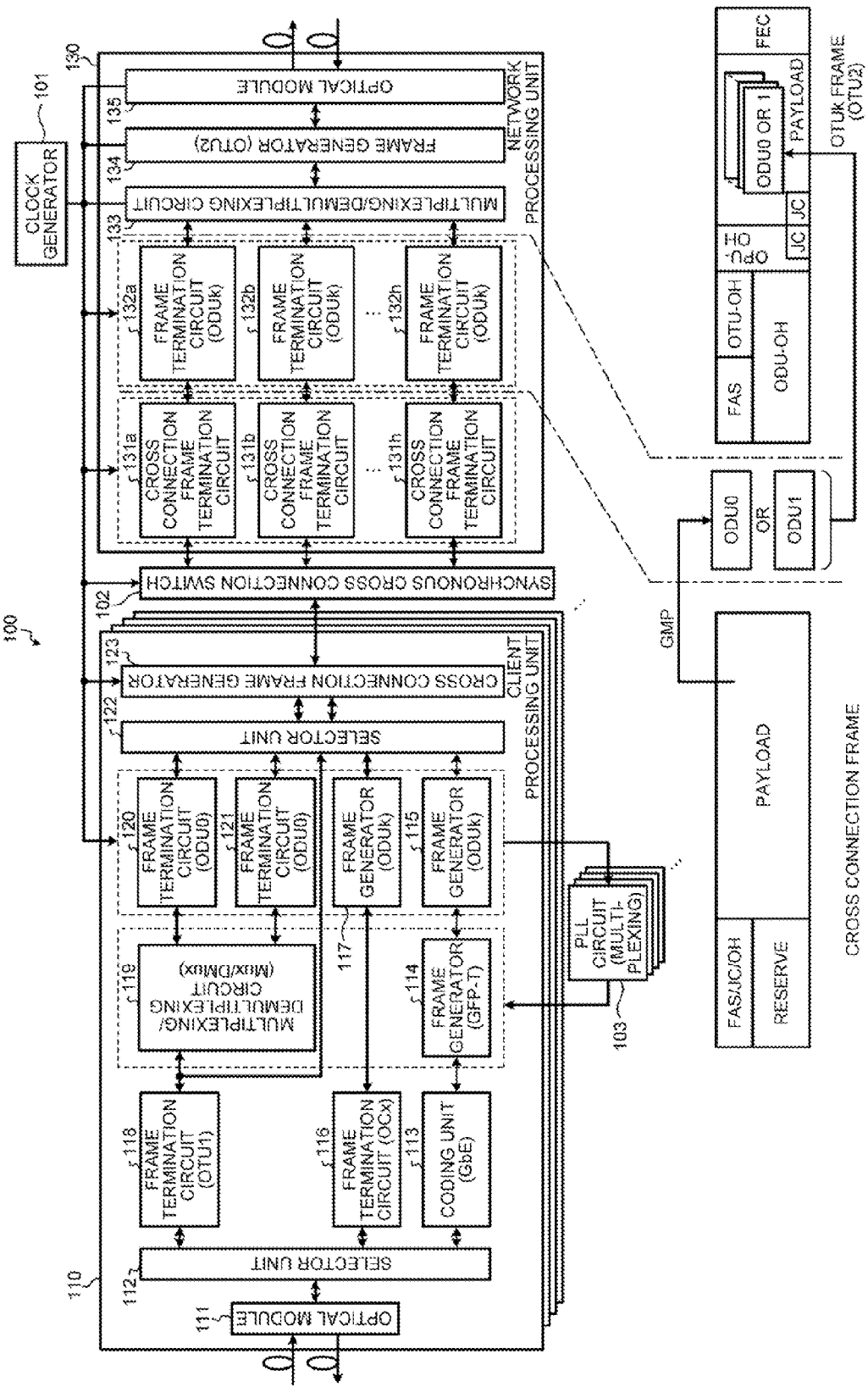

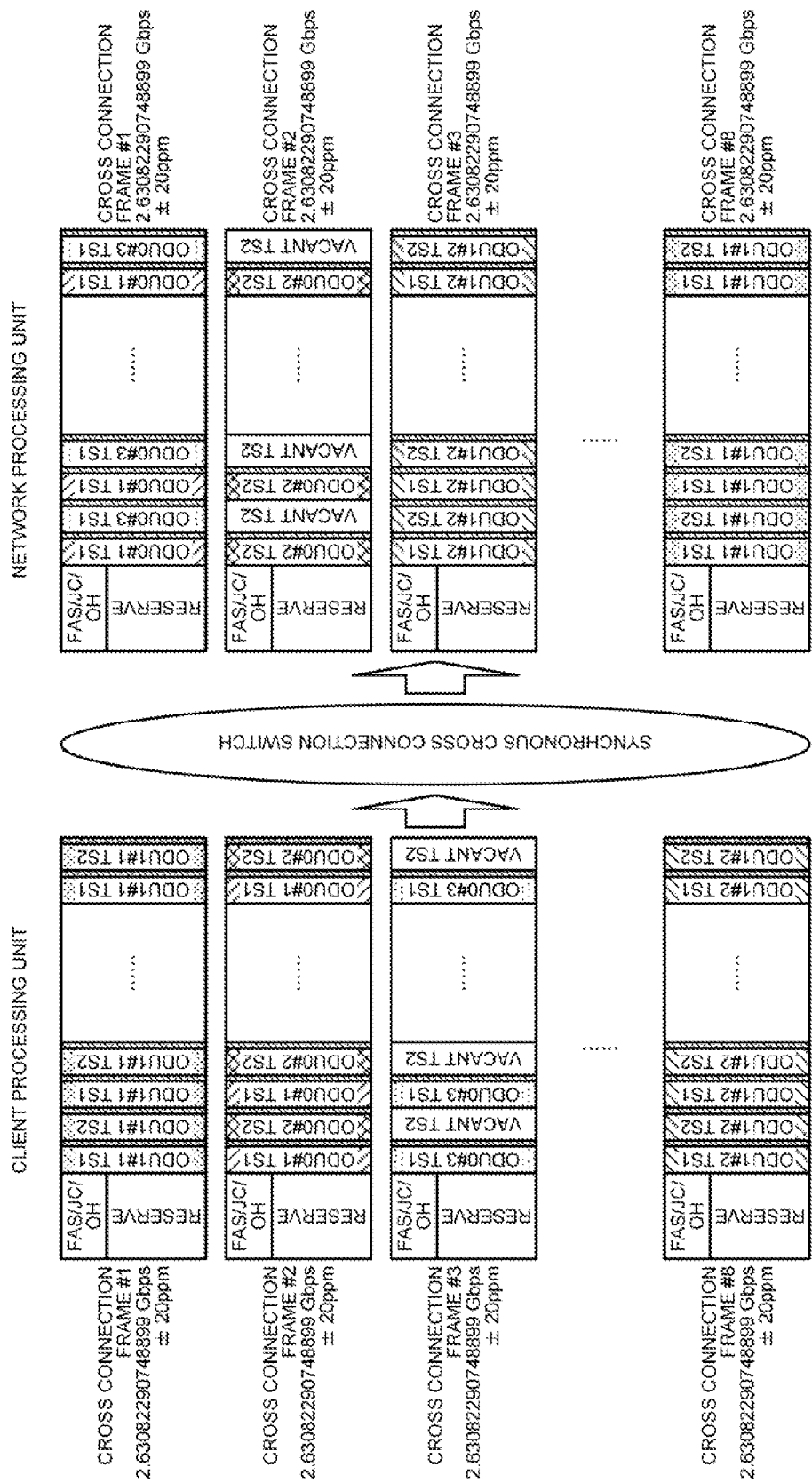

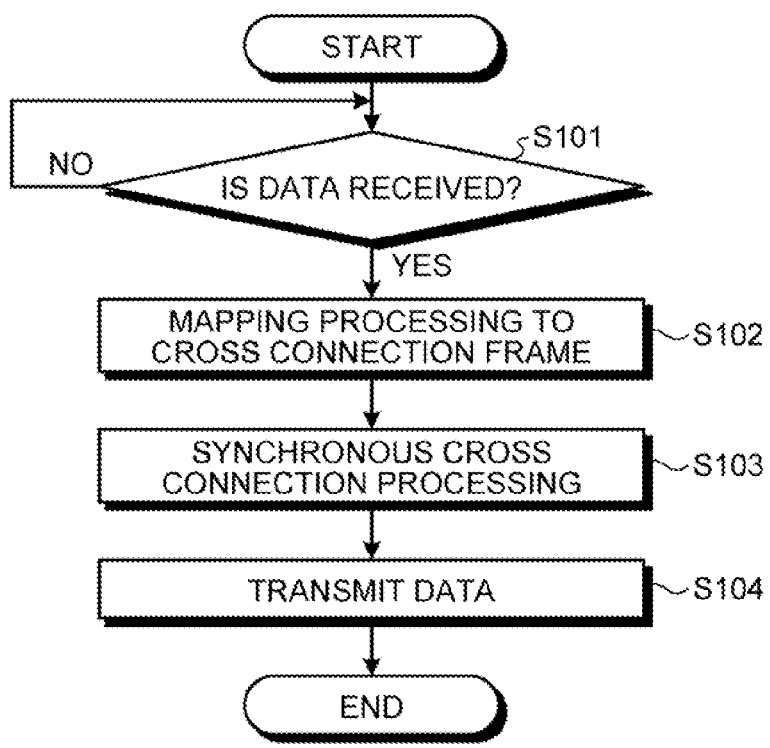

TRANSMISSION APPARATUS AND DATA TRANSMISSION METHOD

CROSS-REFERENCE TO RELATED APPLICATION

This application is based upon and claims the benefit of priority of the prior Japanese Patent Application No. 2011-118491, filed on May 26, 2011, the entire contents of which are incorporated herein by reference.

FIELD

The embodiments discussed herein are directed to a transmission apparatus and a data transmission method.

BACKGROUND

In recent years, transmission methods in an optical transmission system by which asynchronous client data input from a plurality of client apparatuses is converted into frames and then the frames are multiplexed and transmitted are examined. Such transmission methods include, for example, the SONET (Synchronous Optical Network) system, SDH (Synchronous Digital Hierarchy) system, Ethernet (registered trademark) system, and OTN (Optical Transport Network) system. Among these transmission systems, the OTN system receiving particular attention transmits client data of the SONET system or SDH system transparently.

In the OTN system, when client data is multiplexed, the client data may be arranged in TS (Tributary Slot) on the network side in units of OTN frames or may be arranged in TS on the network side after the client data being demultiplexed into a plurality of pieces of data of a lower layer. Also in the OTN system, client data may directly be returned to a client apparatus. Thus, a cross connection function is required in the optical transmission system.

Japanese Laid-open Patent Publication No. 2003-188919

However, according to conventional technology, a problem of a growing apparatus configuration is posed. According to conventional technology, when asynchronous client data is multiplexed on the client side, a PLL (Phase Locked Loop) circuit may be used at least for each port because cross connections occur asynchronously. Such a PLL circuit may be used for the purpose of suppressing jitter accumulation due to interference of asynchronous client data. Also according to conventional technology, when a frame signal is demultiplexed on the network side, the PLL circuit may be used for each port because the clock is extracted for each frame and cross connections occur asynchronously. As a result of the above circumstances, according to conventional technology, the PLL circuit may be used at least for each port on the client side or the network side, leading to a growing apparatus configuration.

SUMMARY

According to an aspect of an embodiment of the invention, a transmission apparatus includes a clock generator that generates a clock; a receiver that receives data; a mapping circuit that maps a plurality of pieces of asynchronous data received by the receiver to a cross connection frame by using the clock generated by the clock generator; a cross connection switch that cross-connects the cross connection frame obtained by the mapping circuit by using the clock generated by the clock generator; and a transmitter that transmits the cross connection frame cross-connected by the cross connection switch.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 14 is a diagram illustrating an operation example of a network processing unit;

FIG. 15 is a diagram illustrating a cross connection operation; and

FIG. 16 is a flow chart illustrating an example of the flow of data transmission processing according to the first embodiment.

DESCRIPTION OF EMBODIMENTS

Preferred embodiments of the present invention will be explained with reference to accompanying drawings. However, the present invention is not limited by the following embodiments.

[a] First Embodiment

System Configuration

Figure 1:
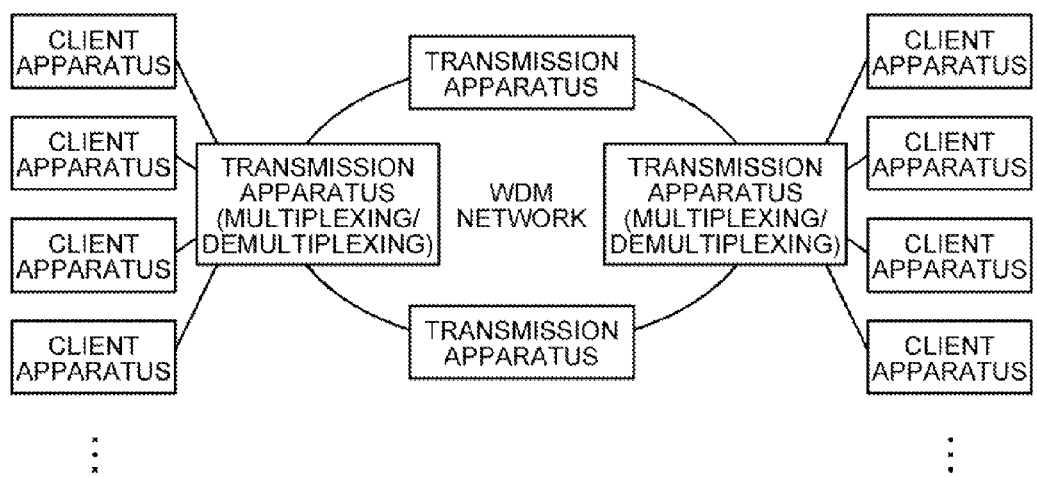
FIG. 1 is a diagram illustrating a configuration example of a transmission system including a transmission apparatus.

The configuration of a transmission system including a transmission apparatus disclosed by the present application will be described by using FIG. 1. FIG. 1 is a diagram illustrating a configuration example of a transmission system including a transmission apparatus.

For example, as illustrated in FIG. 1, the transmission system has transmission apparatuses in a WDM (Wavelength Division Multiplexing) network. Also in the transmission system, a plurality of client apparatuses is connected to the transmission apparatuses via a client network. Each of such client apparatuses inputs, as an aspect, client data such as OC48 (STM-16), OC3 (STM-1), 1 GbE (Giga bit Ethernet (registered trademark)), OTU (Optical channel Transport Unit) 1 into the transmission apparatus. The client data is input into the transmission apparatus asynchronously because the carrier is different from client apparatus to client apparatus and the clock source is different from carrier to carrier.

After receiving client data, for example, the transmission apparatus connected to client apparatuses multiplexes the client data into a Digital Wrapper signal on the WDM network side or demultiplexes the client data, which is an inversion, for cross connections in an OTN layer. The transmission apparatus is, as an aspect, a muxponder unit such as an optical switch apparatus. Data output to the WDM network in this manner is relayed to other transmission apparatuses before being delivered to the destination client apparatus. Details of processing by the transmission apparatus will be described later.

Configuration of the Transmission Apparatus

Figure 2:
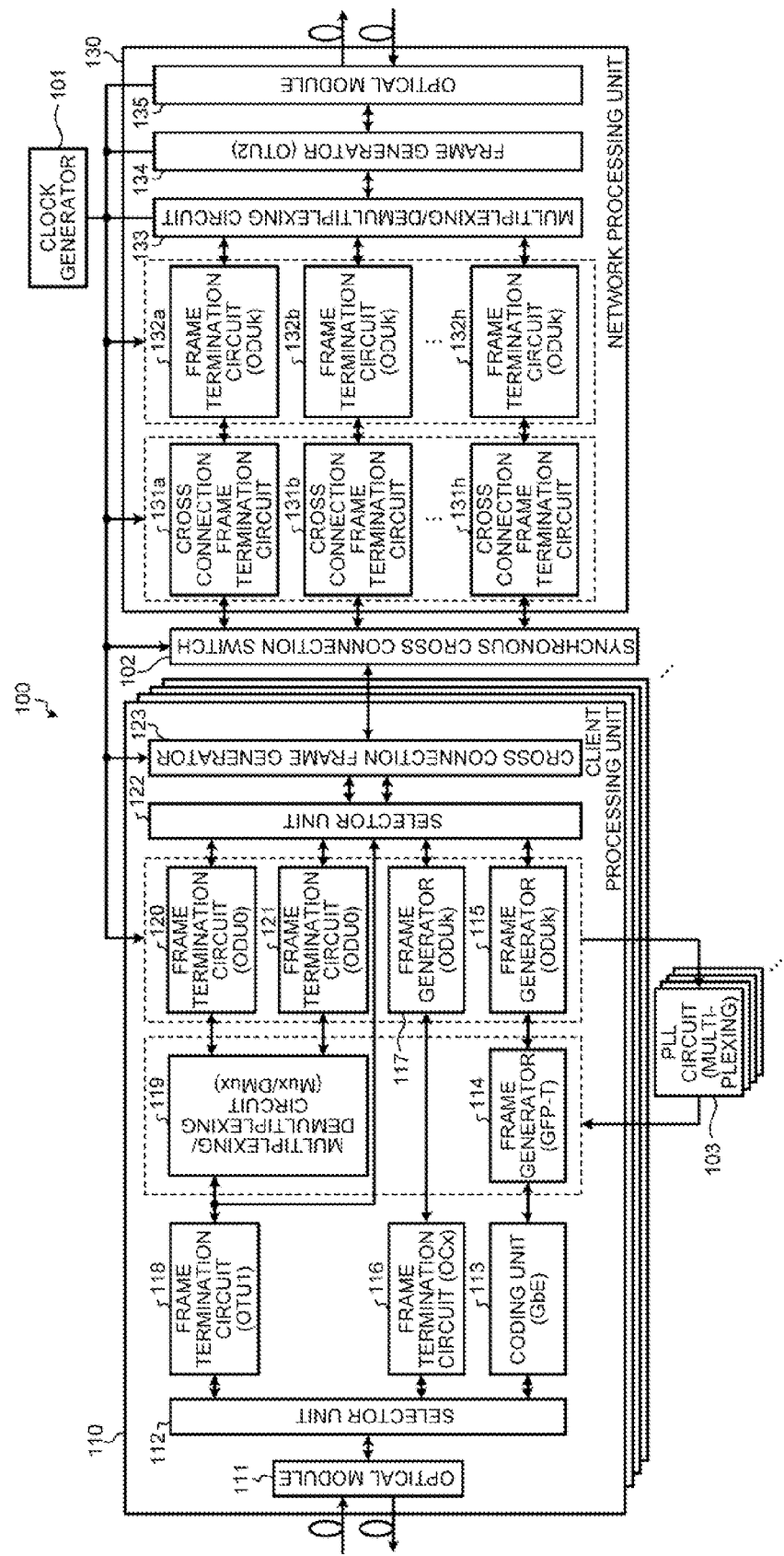
FIG. 2 is a diagram illustrating a configuration example of a transmission apparatus according to a first embodiment.

Next, the configuration of the transmission apparatus will be described by using FIG. 2. FIG. 2 is a diagram illustrating a configuration example of the transmission apparatus according to the first embodiment. For example, as illustrated in FIG. 2, a transmission apparatus 100 includes a clock generator 101, a synchronous cross connection switch 102, a PLL circuit 103, a client processing unit 110, and a network processing unit 130. Processing by each processing unit corresponding to each type of client data will be described later.

The clock generator 101 generates, for example, a clock. The clock generator 101 may generate, as an aspect, a transmission clock in the network processing unit 130. The clock generated by the clock generator 101 is used by a predetermined processing unit in the client processing unit 110 or the network processing unit 130. For example, the synchronous cross connection switch 102 inputs client data received from the client processing unit 110 to the network processing unit 130 or returns the data to the client processing unit 110. Also, for example, the synchronous cross connection switch 102 inputs client data received from the network processing unit 130 to the client processing unit 110 or returns the data to the network processing unit 130. The synchronous cross connection switch 102 also performs cross connection processing by using the clock generated by the clock generator 101. The PLL circuit 103 is used, for example, to transmit asynchronous client data to each client apparatus from an ODU (Optical channel Data Unit) k (k=0, 1) frame.

The client processing unit 110 maps asynchronous client data to a cross connection frame for each piece of client data by using, for example, a clock generated by the clock generator 101. The number of the disposed client processing units 110 is the same as the number of client apparatuses. The client processing unit 110 includes an optical module 111, a selector unit 112, a coding unit 113, a frame generator 114, a frame generator 115, a frame termination circuit 116, and a frame generator 117. The client processing unit 110 also includes a frame termination circuit 118, a multiplexing/demultiplexing circuit (Mux/DMux) 119, a frame termination circuit 120, a frame termination circuit 121, a selector unit 122, and a cross connection frame generator 123. The frame generator 115, the frame generator 117, the frame termination circuit 120, and the frame termination circuit 121 illustrated in FIG. 2 and surrounded by a broken line indicate that each circuit uses a clock generated by the clock generator 101. The frame generator 114 and the multiplexing/demultiplexing circuit 119 illustrated in FIG. 2 and surrounded by a broken line indicate that each processing unit uses the PLL circuit 103.

For example, the optical module 111 receives client data from a client apparatus via a client network and converts the client data from an optical signal into an electric signal. The selector unit 112 outputs client data to the coding unit 113, the frame termination circuit 116, or the frame termination circuit 118 depending on, for example, the type of client data converted into the electric signal by the optical module 111.

The coding unit 113 performs, for example, GbE frame processing and 8B10B coding processing standardized by IEEE (Institute of Electrical and Electronics Engineers) 802.3. The frame generator 114 processes, for example, a GFP (Generic Framing Procedure)-T frame standardized based on ITU-T (International Telecommunication Union-Telecommunication standardization sector) recommendations G. 709 and G. 7041. The frame generator 115 performs mapping, for example, from a GFP-T frame to an ODUk (k=0) frame. At this point, when mapping from the GFP-T frame to the ODUk (k=0) frame, the frame generator 115 performs the mapping in synchronization with the clock generated by the clock generator 101. That is, the coding unit 113 and the frame generator 114 perform processing in slave synchronization with the clock different from carrier to carrier of the client and the frame generator 115 performs processing in synchronization with the clock generated by the clock generator 101.

The frame termination circuit 116 terminates, for example, an OCx (x=3, 12, 48 and the like) signal. The frame generator 117 performs mapping, for example, from an OCx (x=3, 12, 48 and the like) frame to an ODUk (k=0) frame in processing standardized based on the ITU-T recommendation G. 709. At this point, when mapping from the OCx (x=3, 12, 48 and the like) frame to the ODUk (k=0) frame, the frame generator 117 performs the mapping in synchronization with the clock generated by the clock generator 101. That is, the frame termination circuit 116 performs processing in slave synchronization with the clock different from carrier to carrier of the client and the frame generator 117 performs processing in synchronization with the clock generated by the clock generator 101.

The frame termination circuit 118 terminates, for example, an OTU1 signal. In the path from the frame termination circuit 118 to the selector unit 122, the frame termination circuit 118 decodes FEC (Forward Error Correction) code for conversion into an ODUk (k=1) signal by processing based on the ITU-T recommendation G. 709. That is, the frame termination circuit 118 performs processing in slave synchronization with the clock different from carrier to carrier of the client.

The multiplexing/demultiplexing circuit 119 demultiplexes, for example, an ODUk (k=1) frame into two ODUk (k=0) frames of a lower layer. The frame termination circuit 120 and the frame termination circuit 121 terminate an ODUk (k=0) signal. At this point, the frame termination circuit 120 and the frame termination circuit 121 perform processing in synchronization with the clock generated by the clock generator 101. That is, the frame termination circuit 118 and the multiplexing/demultiplexing circuit 119 perform processing in slave synchronization with the clock different from carrier to carrier of the client and the frame termination circuit 120 and the frame termination circuit 121 perform processing in synchronization with the clock generated by the clock generator 101.

For example, the selector unit 122 outputs data input by the frame generator 115, the frame generator 117, the frame termination circuit 118, the frame termination circuit 120, or the frame termination circuit 121 into the cross connection frame generator 123. The selector unit 122 outputs, for example, data input from the network processing unit 130 to the frame generator 115, the frame generator 117, the frame termination circuit 118, the frame termination circuit 120, or the frame termination circuit 121 depending on the type of client data. For example, the cross connection frame generator 123 performs mapping of each frame to a cross connection frame. At this point, the cross connection frame generator 123 performs the mapping in synchronization with the clock generated by the clock generator 101 to generate a cross connection frame.

When, for example, data is received from the synchronous cross connection switch 102, the network processing unit 130 performs various kinds of processing related to data transmission to a network by using the clock generated by the clock generator 101. When, for example, data is received from the network, the network processing unit 130 demultiplexes the network data into a plurality of asynchronous frames and performs mapping of the asynchronous frames to a cross connection frame. The network processing unit 130 includes cross connection frame termination circuits 131a to 131h, frame termination circuits 132a to 132h, a multiplexing/demultiplexing circuit 133, a frame generator 134, and an optical module 135. The frame termination circuits 132a to 132h surrounded by a broken line illustrated in FIG. 2 indicate that the clock generated by the clock generator 101 is used. Similarly, the cross connection frame termination circuits 131a to 131h surrounded by a broken line illustrated in FIG. 2 indicate that the clock generated by the clock generator 101 is used.

For example, the cross connection frame termination circuits 131a to 131h terminate a cross connection frame signal input from the synchronous cross connection switch 102. The frame termination circuits 132a to 132h demultiplex the cross connection frame signal into ODUk (k=0, 1) frames. For example, the multiplexing/demultiplexing circuit 133 multiplexes ODUk (k=0, 1) frame signals obtained by the demultiplexing into an ODUk (k=2) frame. The frame generator 134 performs mapping, for example, from an ODUk (k=2) frame to an OTU2 frame. For example, the optical module 135 converts an electric signal into an optical signal and then outputs the optical signal to a WDM network. When network data is received, data distributed to the frame termination circuits 132a to 132h by the multiplexing/demultiplexing circuit 133 is mapped to a cross connection frame by the cross connection frame termination circuits 131a to 131h. Each processing unit included in the network processing unit 130 performs processing by using the clock generated by the clock generator 101.

Frame Mapping

Figure 3A:
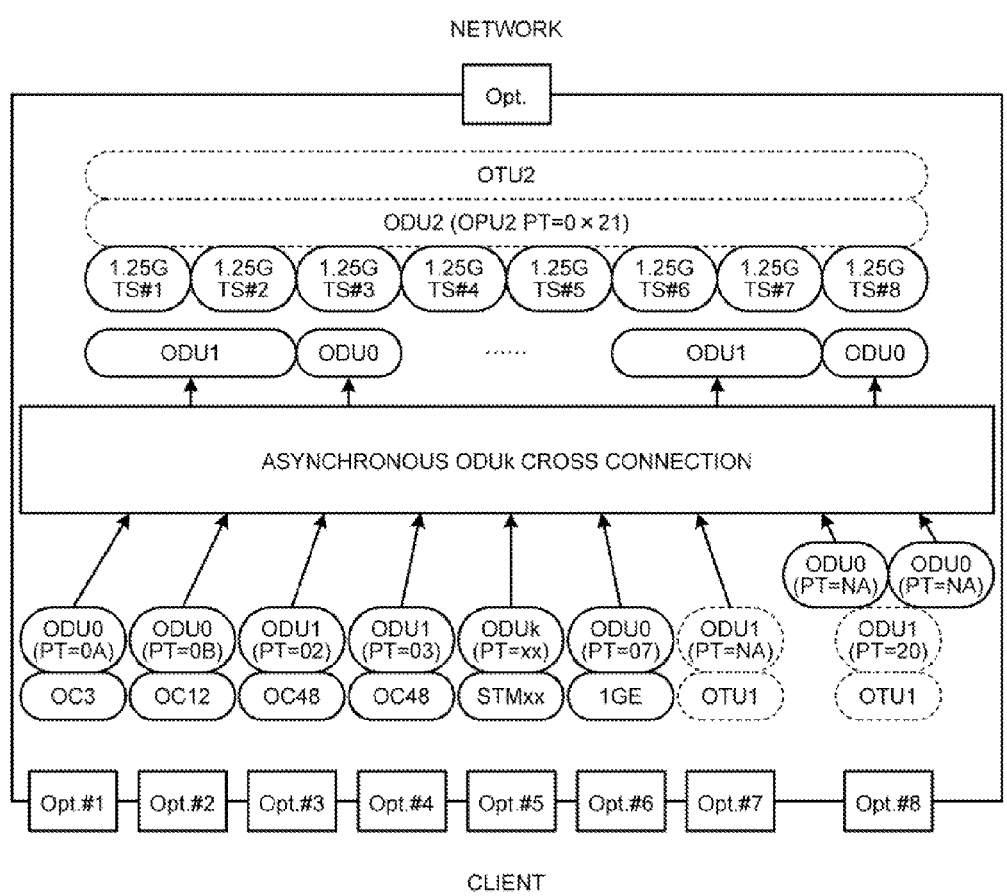
FIG. 3A is a diagram illustrating a configuration example of frame mapping according to related technology.

Next, the configuration of frame mapping will be described by using FIGS. 3A and 3B. FIG. 3A is a diagram illustrating a configuration example of frame mapping according to related technology and FIG. 3B is a diagram illustrating a configuration example of the frame mapping for cross connection synchronization according to the first embodiment.

Figure 3B:
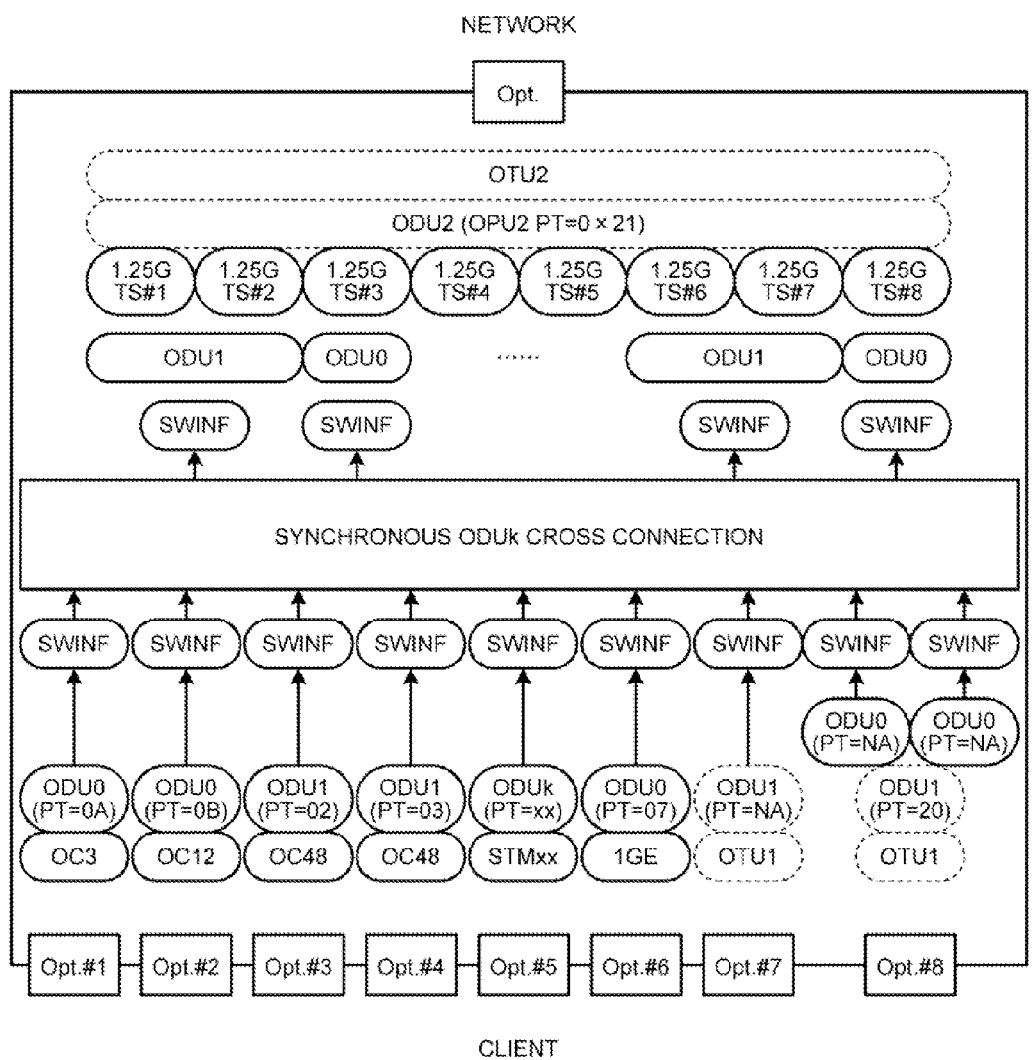
FIG. 3B is a diagram illustrating a configuration example of the frame mapping for cross connection synchronization according to the first embodiment.

"Opt.#1 to Opt.#8" on the client side illustrated in FIGS. 3A and 3B represent an image of a port through which client data is input into the optical module 111 from each client apparatus. Similarly, "Opt." on the network side represents an image of a port through which data is output to a WDM network. Similarly, "OC3", "OC12", "OC48", "STMxx", "1GE", and "OTU1" represent the type of client data input from each client apparatus. Similarly, "ODU0", "ODU1", "ODUk" and the like represent each frame. Similarly, "1.25G TS#1" to "1.25G TS#8" represent the frame termination circuits 132a to 132h respectively. Similarly, "ODU2" and "OTU2" represent the multiplexing/demultiplexing circuit 133 and the frame generator 134 respectively. "SWINF (switch interface)" on the client side illustrated in FIG. 3B represents the cross connection frame generator 123. Similarly, "SWINF" on the network side represents the cross connection frame termination circuits 131a to 131h. In short, as illustrated in FIG. 3B, data in SWINF and thereafter is synchronously cross-connected by providing SWINF between ODUk on the network side and ODUk on the client side.

Operation when Client Data is GbE

Figure 4:
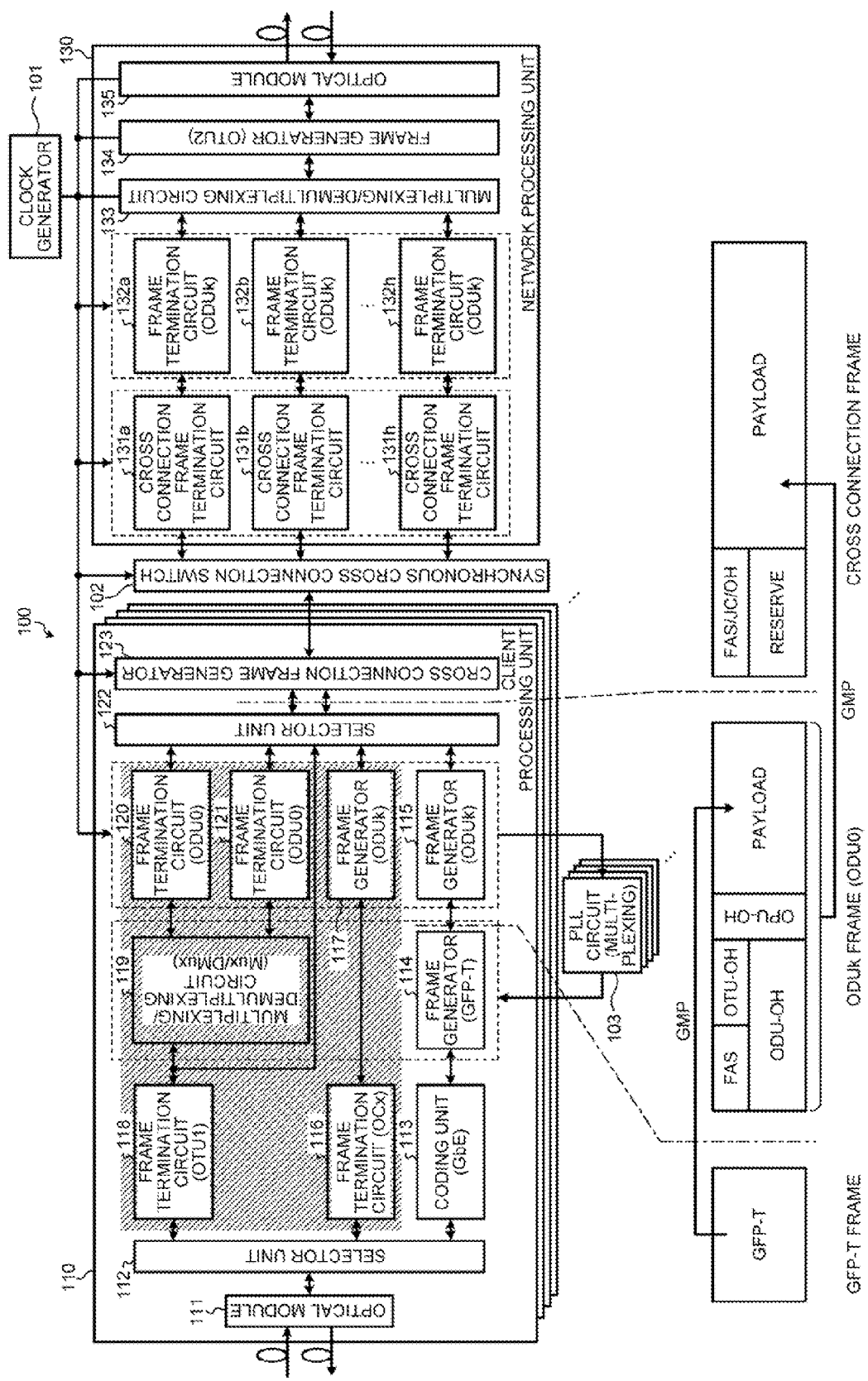
FIG. 4 is a diagram illustrating an operation example of a client processing unit when client data is GbE.

Next, the operation of the client processing unit 110 when client data is GbE will be described by using FIG. 4. FIG. 4 is a diagram illustrating an operation example of the client processing unit 110 when client data is GbE. In FIG. 4, processing units that are not used when the client data is GbE are diagonally shaded.

For example, as illustrated in FIG. 4, the coding unit 113 performs GbE frame processing standardized by IEEE802.3 and 8B10B coding processing, and the frame generator 114 processes a GFP-T frame standardized based on the ITU-T recommendations G. 709 and G. 7041. Client data is processed by each processing unit in the order of the optical module 111, the selector unit 112, the coding unit 113, the frame generator 114, the frame generator 115, the selector unit 122, and the cross connection frame generator 123. Subsequently, the client data is transmitted to the network processing unit 130 via the synchronous cross connection switch 102. On the other hand, data from the network side is transmitted to the client processing unit 110 via the network processing unit 130 and the synchronous cross connection switch 102.

More specifically, as illustrated in the lower part of FIG. 4, the clock generated by the clock generator 101 is used for mapping from a GFP-T frame to an ODUk (k=0) frame in the frame generator 114 to the frame generator 115. At this point, even if a frequency deviation arises between the GFP-T frame and the ODUk (k=0) frame, data can be transmitted without any loss of data because the GMP (Generic Mapping Procedure) method standardized based on the ITU-T recommendation G. 709 is used. That is, because the frequency deviation is absorbed by a JC (justification) byte and a Stuff byte arranged in an OPU (Optical channel Payload Unit) k (k=0) frame and thus, data can be transmitted without any loss of data.

When mapping from an ODUk (k=0) frame to a cross connection frame in the frame generator 115, the selector unit 122, or the cross connection frame generator 123, the clock generated by the clock generator 101 is used. At this point, even if a frequency deviation arises between the ODUk (k=0) frame and the cross connection frame, data can be transmitted without any loss of data because the GMP method is used for mapping to the cross connection frame. That is, because the frequency deviation is absorbed by the JC byte and the Stuff byte arranged in the cross connection frame and thus, data can be transmitted without any loss of data.

Figure 5:
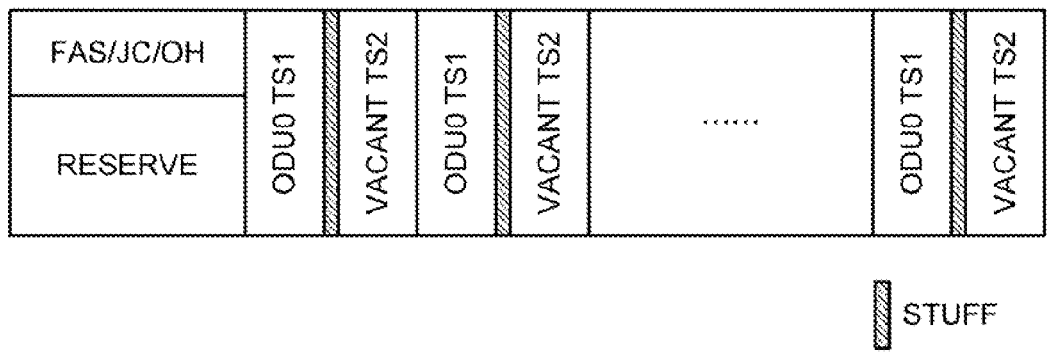
FIG. 5 is a diagram illustrating an example of a cross connection frame when the client data is GbE.

FIG. 5 is a diagram illustrating an example of the cross connection frame when the client data is GbE. If, for example, as illustrated in FIG. 5, only one frame of ODUk (k=0) is mapped to the cross connection frame, payload includes 2TS (Tributary Slot) and 1TS thereof is used for mapping. In FIG. 5, shaded portions indicate the Stuff byte.

That is, according to the client processing unit 110 illustrated in FIG. 4, the bit rate of the cross connection frame is set to a frequency that is higher than the ODUk (k=1) frame and can secure a band of the ODUk (k=0, 1) frame. As a result, a cross connection frame synchronized with the clock used in the network processing unit 130 can be built without losing any mapped ODUk (k=0, 1) frame.

Operation when client data is OC3/OC12

Figure 6:
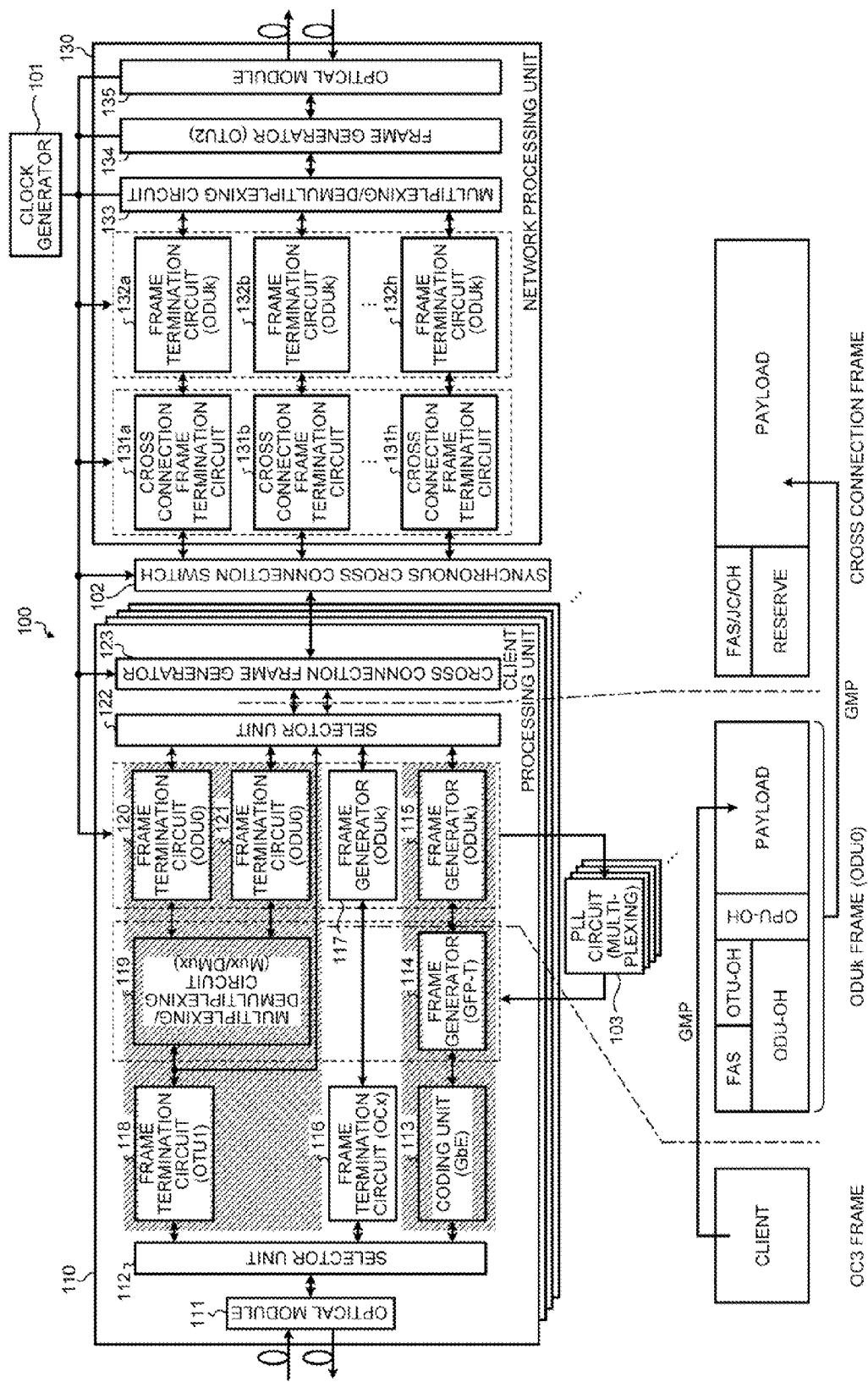
FIG. 6 is a diagram illustrating an operation example of the client processing unit when the client data is OC3/OC12.

Next, the operation of the client processing unit 110 when client data is OC3/OC12 will be described by using FIG. 6. FIG. 6 is a diagram illustrating an operation example of the client processing unit 110 when the client data is OC3/OC12. In FIG. 6, processing units that are not used when the client data is OC3/OC12 are diagonally shaded.

For example, as illustrated in FIG. 6, the client data is processed by each processing unit in the order of the optical module 111, the selector unit 112, the frame termination circuit 116, the frame generator 117, the selector unit 122, and the cross connection frame generator 123. Subsequently, the client data is transmitted to the network processing unit 130 via the synchronous cross connection switch 102. On the other hand, data from the network side is transmitted to the client processing unit 110 via the network processing unit 130 and the synchronous cross connection switch 102.

More specifically, as illustrated in the lower part of FIG. 6, the clock generated by the clock generator 101 is used for mapping from an OC3/OC12 signal to an ODUk (k=0) frame signal in the frame termination circuit 116 to the frame generator 117. At this point, even if a frequency deviation arises between the OC3/OC12 frame and the ODUk (k=0) frame, data can be transmitted without any loss of data because the GMP method standardized based on the ITU-T recommendation G. 709 is used. That is, because the frequency deviation is absorbed by the JC byte and the Stuff byte arranged in an OPU k (k=0) frame and thus, data can be transmitted without any loss of data.

When mapping from an ODUk (k=0) frame to a cross connection frame in the frame generator 117, the selector unit 122, or the cross connection frame generator 123, the clock generated by the clock generator 101 is used. At this point, even if a frequency deviation arises between the ODUk (k=0) frame and the cross connection frame, data can be transmitted without any loss of data because the GMP method is used for mapping to the cross connection frame. That is, because the frequency deviation is absorbed by the JC byte and the Stuff byte arranged in the cross connection frame and thus, data can be transmitted without any loss of data.

Figure 7:
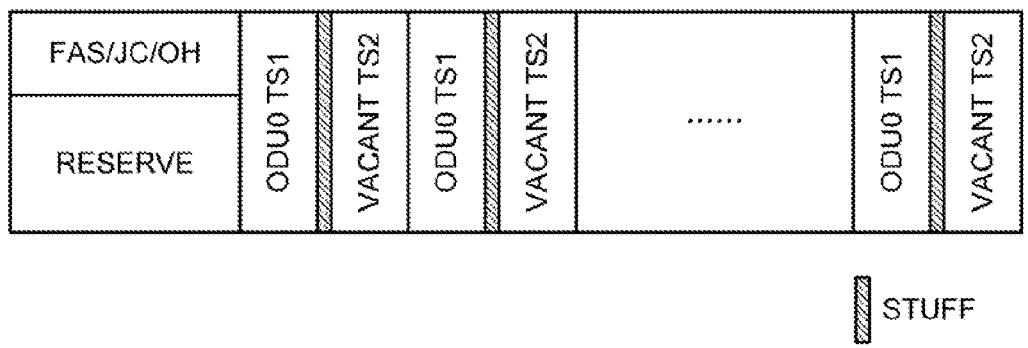
FIG. 7 is a diagram illustrating an example of the cross connection frame when the client data is OC3/OC12.

FIG. 7 is a diagram illustrating an example of the cross connection frame when the client data is OC3/OC12. If, for example, as illustrated in FIG. 7, only one frame of ODUk (k=0) is mapped to the cross connection frame, payload includes 2TS and 1TS thereof is used for mapping. In FIG. 7, shaded portions indicate the Stuff byte.

That is, according to the client processing unit 110 illustrated in FIG. 6, the bit rate of the cross connection frame is set to a frequency that is higher than the ODUk (k=1) frame and can secure a band of the ODUk (k=0, 1) frame. As a result, a cross connection frame synchronized with the clock used in the network processing unit 130 can be built without losing any mapped ODUk (k=0, 1) frame.

Operation when Client Data is OC48

Figure 8:
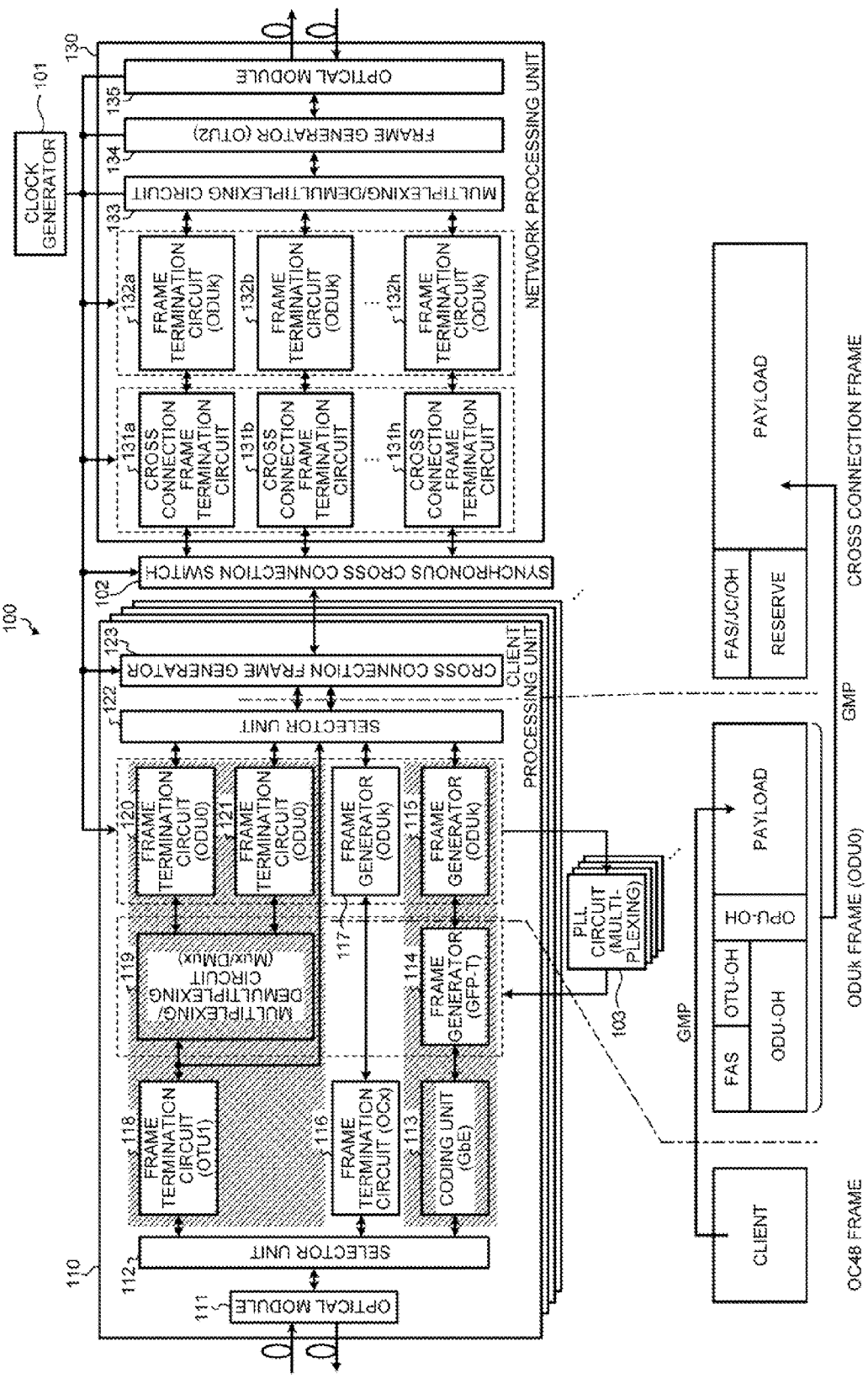
FIG. 8 is a diagram illustrating an operation example of the client processing unit when the client data is OC48.

Next, the operation of the client processing unit 110 when the client data is OC48 will be described by using FIG. 8. FIG. 8 is a diagram illustrating an operation example of the client processing unit 110 when the client data is OC48. In FIG. 8, processing units that are not used when the client data is OC48 are diagonally shaded.

For example, as illustrated in FIG. 8, the client data is processed by each processing unit in the order of the optical module 111, the selector unit 112, the frame termination circuit 116, the frame generator 117, the selector unit 122, and the cross connection frame generator 123. Subsequently, the client data is transmitted to the network processing unit 130 via the synchronous cross connection switch 102. On the other hand, data from the network side is transmitted to the client processing unit 110 via the network processing unit 130 and the synchronous cross connection switch 102.

More specifically, as illustrated in the lower part of FIG. 8, the clock generated by the clock generator 101 is used for mapping from an OC48 signal to an ODUk (k=1) frame signal in the frame termination circuit 116 to the frame generator 117. At this point, even if a frequency deviation arises between the OC48 frame and the ODUk (k=1) frame, data can be transmitted without any loss of data because the BMP (Bit synchronous Mapping Procedure) method standardized based on the ITU-T recommendation G. 709 is used. That is, because the frequency of the ODUk (k=1) frame is higher than the frequency of OC48, an ODUk (k=1) frame can be generated without causing any loss of data while the band of an OC48 frame being secured.

When mapping from an ODUk (k=1) frame to a cross connection frame in the frame generator 117, the selector unit 122, or the cross connection frame generator 123, the clock generated by the clock generator 101 is used. At this point, even if a frequency deviation arises between the ODUk (k=1) frame and the cross connection frame, data can be transmitted without any loss of data because the GMP method is used for mapping to the cross connection frame. That is, because the frequency deviation is absorbed by the JC byte and the Stuff byte arranged in the cross connection frame and thus, data can be transmitted without any loss of data.

Figure 9:
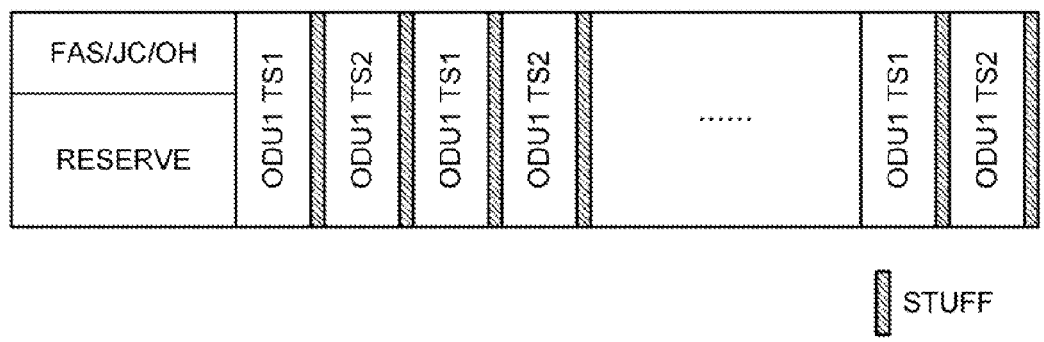
FIG. 9 is a diagram illustrating an example of the cross connection frame when the client data is OC48.

FIG. 9 is a diagram illustrating an example of the cross connection frame when the client data is OC48. If, for example, as illustrated in FIG. 9, ODUk (k=1) frames are mapped to the cross connection frame, payload includes 2TS and both 2TS thereof are used for mapping. In FIG. 9, shaded portions indicate the Stuff byte.

That is, according to the client processing unit 110 illustrated in FIG. 8, the bit rate of the cross connection frame is set to a frequency that is higher than the ODUk (k=1) frame and can secure a band of the ODUk (k=0, 1) frame. As a result, a cross connection frame synchronized with the clock used in the network processing unit 130 can be built without losing any mapped ODUk (k=0, 1) frame.

Operation when client data is OTU1 and is not demultiplexed to a lower layer

Figure 10:
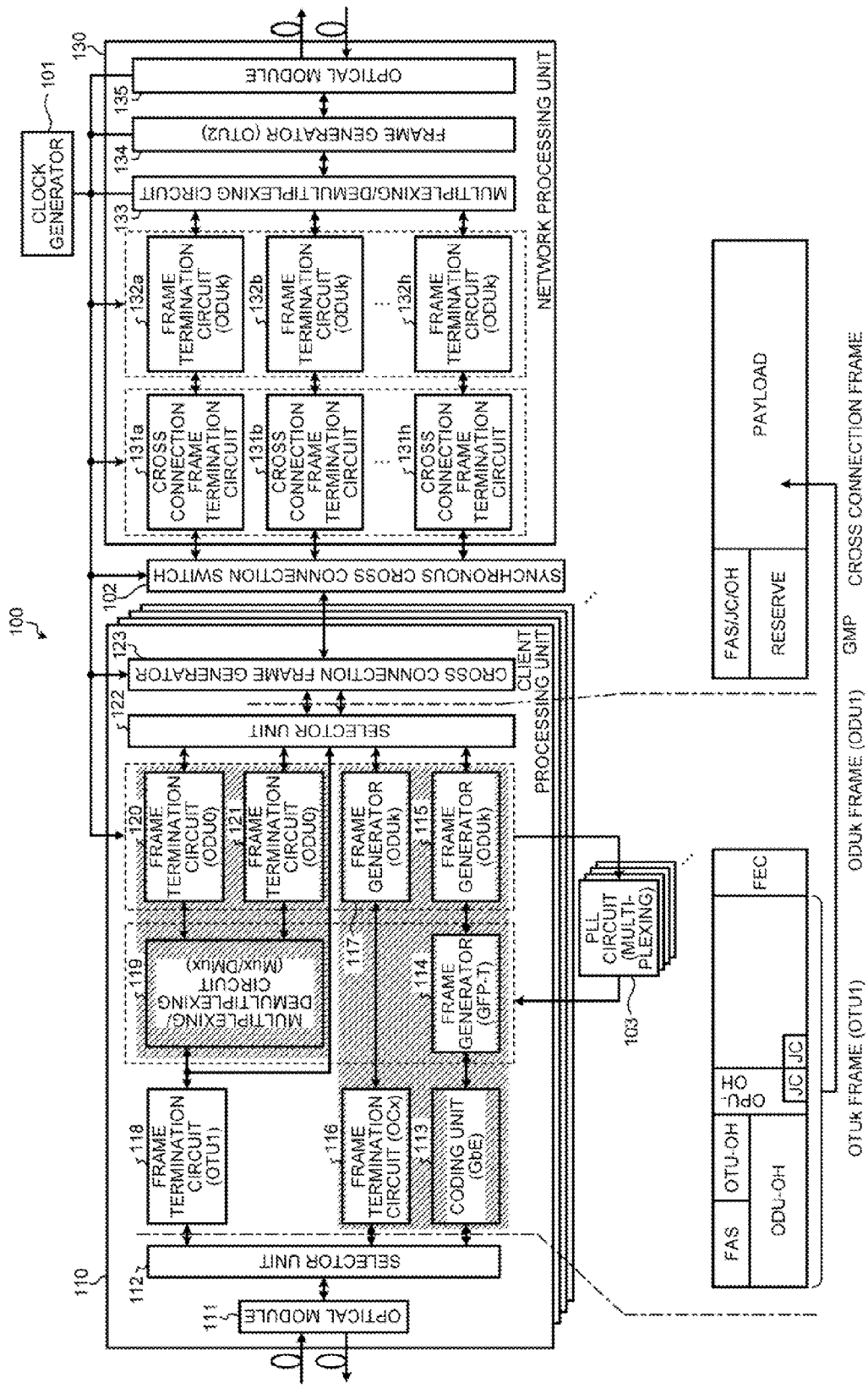
FIG. 10 is a diagram illustrating an operation example of the client processing unit when the client data is OTU1 and is not demultiplexed to a lower layer.

Next, the operation of the client processing unit 110 when the client data is OTU1 and is not demultiplexed to a lower layer will be described by using FIG. 10. FIG. 10 is a diagram illustrating an operation example of the client processing unit 110 when the client data is OTU1 and is not demultiplexed to a lower layer. In FIG. 10, processing units that are not used when the client data is OTU1 and is not demultiplexed to the lower layer are diagonally shaded.

For example, as illustrated in FIG. 10, the client data is processed by each processing unit in the order of the optical module 111, the selector unit 112, the frame termination circuit 118, the selector unit 122, and the cross connection frame generator 123. Subsequently, the client data is transmitted to the network processing unit 130 via the synchronous cross connection switch 102. On the other hand, data from the network side is transmitted to the client processing unit 110 via the network processing unit 130 and the synchronous cross connection switch 102.

More specifically, as illustrated in the lower part of FIG. 10, mapping from an ODUk (k=1) frame to a cross connection frame is performed in the frame termination circuit 118 to the selector unit 122. At this point, even if a frequency deviation arises between the ODUk (k=1) frame and the cross connection frame, data can be transmitted without any loss of data because the GMP method is used for mapping to the cross connection frame. That is, because the frequency deviation is absorbed by the JC byte and the Stuff byte arranged in the cross connection frame and thus, data can be transmitted without any loss of data.

Figure 11:
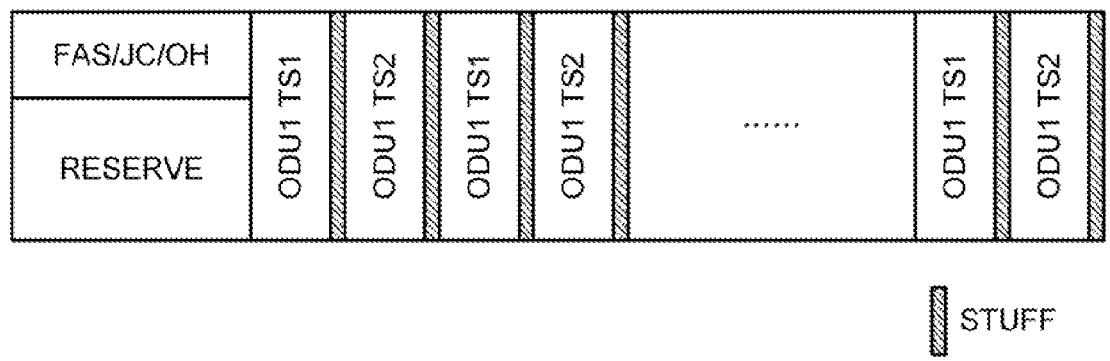
FIG. 11 is a diagram illustrating an example of the cross connection frame when the client data is OTU1 and is not demultiplexed to the lower layer.

FIG. 11 is a diagram illustrating an example of the cross connection frame when the client data is OTU1 and is not demultiplexed to the lower layer. If, for example, as illustrated in FIG. 11, only ODUk (k=1) frames are mapped to the cross connection frame, payload includes 2TS and both 2TS thereof are used for mapping. In FIG. 11, shaded portions indicate the Stuff byte.

That is, according to the client processing unit 110 illustrated in FIG. 10, the bit rate of the cross connection frame is set to a frequency that is higher than the ODUk (k=1) frame and can secure a band of the ODUk (k=0, 1) frame. As a result, a cross connection frame synchronized with the clock used in the network processing unit 130 can be built without losing any mapped ODUk (k=0, 1) frame.

Operation when client data is OTU1 and is demultiplexed to a lower layer

Figure 12:
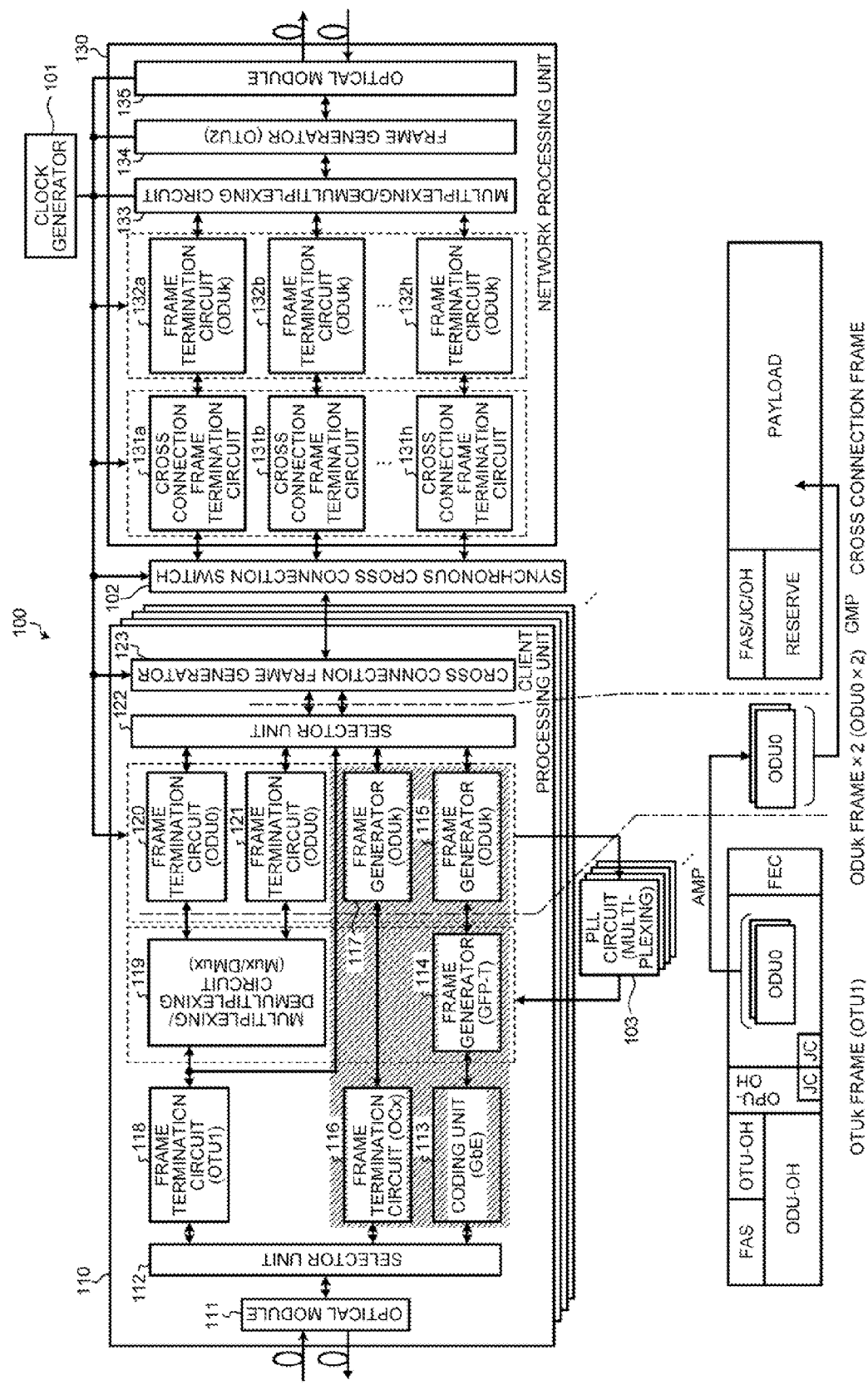
FIG. 12 is a diagram illustrating an operation example of the client processing unit when the client data is OTU1 and is demultiplexed to the lower layer.

Next, the operation of the client processing unit 110 when the client data is OTU1 and is demultiplexed to a lower layer will be described by using FIG. 12. FIG. 12 is a diagram illustrating an operation example of the client processing unit 110 when the client data is OTU1 and is demultiplexed to the lower layer. In FIG. 12, processing units that are not used when the client data is OTU1 and is demultiplexed to the lower layer are diagonally shaded.

For example, as illustrated in FIG. 12, the client data is processed by each processing unit in the order of the optical module 111, the selector unit 112, the frame termination circuit 118, and the multiplexing/demultiplexing circuit 119. Subsequent to the processing by the multiplexing/demultiplexing circuit 119, the client data is processed by each processing unit in the order of the frame termination circuit 120 or the frame termination circuit 121, the selector unit 122, and the cross connection frame generator 123. Subsequently, the client data is transmitted to the network processing unit 130 via the synchronous cross connection switch 102. On the other hand, data from the network side is transmitted to the client processing unit 110 via the network processing unit 130 and the synchronous cross connection switch 102.

More specifically, as illustrated in the lower part of FIG. 12, the clock generated by the clock generator 101 is used for demultiplexing an OTUk (k=1) frame into two ODUk (k=0) frames in the multiplexing/demultiplexing circuit 119 to the frame termination circuit 120 and the frame termination circuit 121. At this point, because the AMP (Asynchronous Mapping Procedure) method standardized based on the ITU-T recommendation G. 709 is used, valid areas of data can be determined based on the JC byte and two ODUk (k=0) frames can be obtained without any loss of data.

The two demultiplexed ODUk (k=0) frames are mapped to the cross connection frame in the frame termination circuit 120, the frame termination circuit 121, the selector unit 122, and the cross connection frame generator 123. At this point, even if a frequency deviation arises between the two ODUk (k=0) frames and the cross connection frame, data can be transmitted without any loss of data because the GMP method is used for mapping to the cross connection frame. That is, because the frequency deviation is absorbed by the JC byte and the Stuff byte arranged in the cross connection frame and thus, data can be transmitted without any loss of data.

Figure 13:
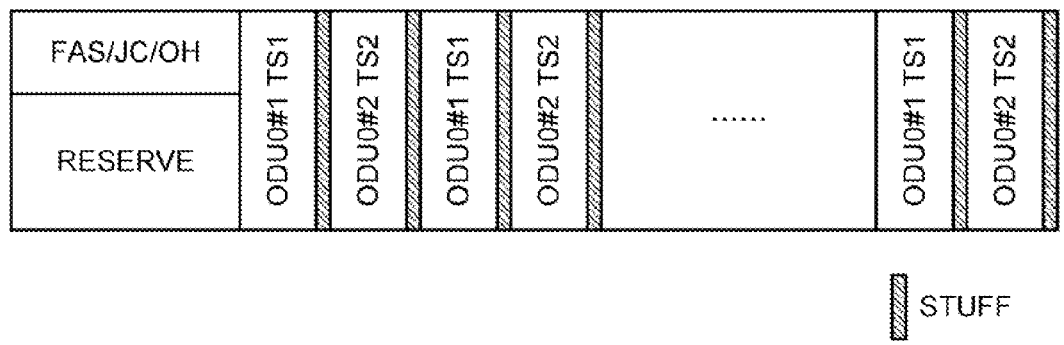
FIG. 13 is a diagram illustrating an example of the cross connection frame when the client data is OTU1 and is demultiplexed to the lower layer.

FIG. 13 is a diagram illustrating an example of the cross connection frame when the client data is OTU1 and is demultiplexed to the lower layer. If, for example, as illustrated in FIG. 13, each of the two frames of ODUk (k=0) is mapped to the cross connection frame, payload includes 2TS and mapping to each TS is performed. In FIG. 13, shaded portions indicate the Stuff byte.

That is, according to the client processing unit 110 illustrated in FIG. 12, the bit rate of the cross connection frame is set to a frequency that is higher than the ODUk (k=1) frame and can secure a band of the ODUk (k=0, 1) frame. As a result, a cross connection frame synchronized with the clock used in the network processing unit 130 can be built without losing any mapped ODUk (k=0, 1) frame.

Operation of the Network Processing Unit

Next, the operation of the network processing unit 130 will be described by using FIG. 14. FIG. 14 is a diagram illustrating an operation example of the network processing unit 130.

For example, as illustrated in FIG. 14, a cross connection signal is input into the network processing unit 130 from the synchronous cross connection switch 102. The cross connection signal is processed by each processing unit in the order of the cross connection frame termination circuits 131a to 131h, the frame termination circuits 132a to 132h, the multiplexing/demultiplexing circuit 133, the frame generator 134, and the optical module 135 before being transmitted to a WDM network. The processing by each of these processing units is all performed in synchronization with the clock generated by the clock generator 101. On the other hand, data from the network side is processed by each processing unit in the order of the optical module 135, the frame generator 134, the multiplexing/demultiplexing circuit 133, the frame termination circuits 132a to 132h, and the cross connection frame termination circuits 131a to 131h. Then, the data is transmitted to the client processing unit 110 via the synchronous cross connection switch 102.

The processing by the cross connection frame termination circuits 131a to 131h to the frame termination circuits 132a to 132h will be described. More specifically, as illustrated in the lower part of FIG. 14, the processing to demultiplex a cross connection frame signal into ODUk (k=0, 1) frame signals is performed by the client processing unit 110 by using the GMP method. That is, valid areas of data can be determined based on the JC byte and the Stuff byte and thus, the ODUk (k=0, 1) frames can be obtained without any loss of data.

ODUk (k=0, 1) frame signals are multiplexed into an ODUk (k=2) frame signal by the frame termination circuits 132a to 132h to the multiplexing/demultiplexing circuit 133.

At this point, processing to multiplex ODUk (k=0, 1) frame signals into an ODUk (k=2) frame signal is performed by the processing standardized based on the ITU-T recommendation G. 709. In this case, when ODUk (k=0, 1) frame signals demultiplexed from a cross connection frame are multiplexed into an ODUk (k=2) frame signal, processing of the cross connection frame and processing of the ODUk (k=0, 1, 2) frames can be performed without any loss of data. This is because, even if a frequency deviation arises between the ODUk (k=0, 1) frames and the ODUk (k=2) frame, the GMP method and the AMP method are used for multiplexing the ODUk (k=0, 1) frames into the ODUk (k=2) frame. That is, the frequency deviation is absorbed by the JC byte and the Stuff byte arranged in the ODUk (k=2) frame and thus, processing of the cross connection frame and processing of the ODUk (k=0, 1, 2) frames can be performed without any loss of data.

FIG. 15 is a diagram illustrating a cross connection operation. FIG. 15 illustrates that the cross connection frames #1 to #8 correspond to the frame termination circuits 132a to 132h. Also in FIG. 15, the same patterns are attached to corresponding ODUks in the client processing unit 110 and the network processing unit 130.

As described above, the transmission apparatus 100 synchronizes all cross connection frames by using the clock generated by the clock generator 101 for cross connections. Accordingly, for example, as illustrated in FIG. 15, TS of the cross connection frame #1 in the client processing unit 110 is arranged in TS of the cross connection frame #8 in the network processing unit 130. Also, TS1 of the cross connection frame #2 in the client processing unit 110 is arranged in TS of the cross connection frame #1 in the network processing unit 130. Also, TS2 of the cross connection frame #2 in the client processing unit 110 is arranged in TS of the cross connection frame #2 in the network processing unit 130. Also, TS1 of the cross connection frame #3 in the client processing unit 110 is arranged in TS of the cross connection frame #1 in the network processing unit 130. Also, TS2 of the cross connection frame #3 in the client processing unit 110 is arranged in TS of the cross connection frame #2 in the network processing unit 130. Also, TS of the cross connection frame #8 in the client processing unit 110 is arranged in TS of the cross connection frame #3 in the network processing unit 130.

Data transmission processing flow according to the first embodiment

Next, the flow of data transmission processing according to the first embodiment will be described by using FIG. 16. FIG. 16 is a flow chart illustrating an example of the flow of data transmission processing according to the first embodiment.

First, a case where client data is received will be described. If, for example, as illustrated in FIG. 16, client data is received (step S101, Yes), the transmission apparatus 100 performs mapping processing to a cross connection frame based on a transmission clock used by the network processing unit 130 (step S102). If no client data is received (step S101, No), the transmission apparatus 100 is in a state ready for receiving client data.

Then, the transmission apparatus 100 synchronizes cross connection processing by performing the cross connection processing based on the transmission clock used by the network processing unit 130 (step S103). Subsequently, the transmission apparatus 100 performs various kinds of processing based on the transmission clock used by the network processing unit 130 to transmit data to a WDM network (step S104).

Next, a case where network data is received will be described. If, for example, as illustrated in FIG. 16, network data is received (step S101, Yes), the transmission apparatus 100 demultiplexes an OTU2 frame into ODUk (k=0, 1) frames in a lower layer. Further, the transmission apparatus 100 performs mapping processing from the ODUk frames to a cross connection frame (step S102). If no network data is received (step S101, No), the transmission apparatus 100 is in a state ready for receiving network data.

Then, the transmission apparatus 100 performs cross connection processing (step S103) and performs various kinds of processing for each client on the side of the client processing unit 110 to transmit data to the client apparatus (step S104).

Effect According to the First Embodiment

As described above, the transmission apparatus 100 performs cross connection processing after synchronizing asynchronous client data with the same clock as the clock on the network side and therefore, a smaller size of the overall apparatus can be realized. In short, the transmission apparatus 100 can realize a smaller size of the overall apparatus, when compared with technology that needs a PLL circuit generating a clock for each piece of client data to perform cross connection processing while the client data is asynchronous. Because the transmission apparatus 100 can overall be made smaller in size, power consumption and the calorific value can be reduced.

[b] Second Embodiment

An embodiment of the transmission apparatus 100 disclosed in the present application has been described, but various embodiments different from the above embodiment may be carried out. Thus, a different embodiment will be described.

Information including processing procedures, control procedures, concrete names, and various kinds of data and parameters illustrated in the above document and drawings can, if not specifically mentioned, arbitrarily be changed. Each member of the illustrated transmission apparatus 100 does not necessarily need to be physically configured as illustrated. That is, the concrete form of distribution/integration of each processing unit is not limited to the illustrated form and all or a portion thereof may be functionally or physically distributed/integrated in any unit in accordance with various loads or usage. For example, the clock generator 101 may be included in the network processing unit 130. Similarly, the synchronous cross connection switch 102 may be included in the network processing unit 130. A hardware configuration of the transmission apparatus 100 can be realized, as an aspect, as an integrated circuit like one FPGA (Field-Programmable Gate Array) combining a plurality of the client processing units 110 illustrated in FIG. 2 or the like. Further, functions of the clock generator 101, the synchronous cross connection switch 102, the client processing unit 110, the network processing unit 130 and the like may be mounted on one ASIC (Application Specific Integrated Circuit). Further, a program of a portion or all of processing performed by the client processing unit 110 or the network processing unit 130 may be stored in a memory so that the processing is performed by reading the program from the memory into a CPU (Central Processing Unit) or the like.

An aspect of a transmission apparatus and a data transmission method disclosed in the present application achieves an effect of seeking to make the apparatus configuration smaller in size.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A transmission apparatus, comprising:
a clock generator that generates a clock;
a receiver that receives a plurality of pieces of asynchronous data from a plurality of clients connected to the transmission apparatus via a first network;
a first mapping circuit that maps the plurality of pieces of asynchronous data received by the receiver to ODU (Optical channel Data Unit) k (k=0, 1) frames;
a second mapping circuit that maps the ODUk frames to a cross connection frame;
a cross connection switch that cross-connects the cross connection frame obtained by the second mapping circuit by using the clock generated by the clock generator; and
a transmitter that transmits a frame including data obtained from the cross connection frame output from the cross connection switch to another apparatus connected to the transmission apparatus via a second network, by using the clock generated by the clock generator, wherein
the second mapping circuit maps the ODUk frames in synchronization with the clock with which transmission of the frame is synchronized by the transmitter.

2. The transmission apparatus according to claim 1, wherein
when the plurality of pieces of asynchronous data each received from a client is an OTU (Optical channel Transport Unit) k (k=1) frame, the first mapping circuit demultiplexes the OTUk frame into ODUk (k=0) frames, and
the second mapping circuit maps the demultiplexed ODUk (k=0) frames to the cross connection frame.

3. The transmission apparatus according to claim 1, further comprising
a termination circuit that terminates the cross connection frame output from the cross connection switch to generate a frame including data obtained from the cross connection frame, wherein
the transmitter transmits the frame generated by the termination circuit to the another apparatus by using the clock generated by the clock generator.

4. The transmission apparatus according to claim 1, further comprising
a selector that outputs each piece of asynchronous data received by the receiver to the first mapping circuit depending on a type of the each piece of asynchronous data.

5. A data transmission method executed by a computer, the data transmission method comprising:
generating a clock;
receiving a plurality of pieces of asynchronous data from a plurality of clients connected to the computer via a first network;
first mapping the plurality of pieces of asynchronous data received at the receiving to ODU (Optical channel Data Unit) k (k=0, 1) frames;
second mapping the ODUk frames to a cross connection frame;
cross-connecting, by a cross connection switch, the cross connection frame obtained at the second mapping by using the generated clock; and
transmitting a frame including data obtained from the cross connection frame output from the cross connection switch to another computer connected to the computer via a second network by using the generated clock, wherein
the second mapping includes mapping the ODUk frames in synchronization with the generated clock with which transmission of the frame is synchronized at the transmitting.

* * * * *